2,769,749
METHOD OF EXTRACTING AND PURIFYING ACYLASE

William M. Thompson and Leonard A. Graham, Chicago, and Roland J. Seidel, Des Plaines, Ill., assignors to Armour and Company, Chicago, Ill., a corporation of Illinois No Drawing. Application February 24, 1953, Serial No. 338,612

10 Claims. (Cl. 195—66)

This invention relates to a method of extracting and purifying acylase.

Acylase is an enzyme found in kidney and more particularly in kidney cortex. It is characterized by its ability to resolve racemic mixtures of certain amino acids, e. g., racemic mixtures of alanine. For example, the action of acylase is to hydrolyze the acyl radical of L-alanine without altering the D-alanine. This mechanism is discussed more fully in "The Resolution of Several Racemic Amino Acids," J. Bio. Chem., 179, 1169 (1949).

It is a general object of this invention to provide a method of extracting and purifying acylase which is both simpler and cheaper than previously known methods, and which is better adapted for commercial-scale operation. A more specific object of this invention is to provide a method for extracting substantially all of the acylase in acylase-bearing kidney tissue, while at the same time minimizing the extraction of acylase-inert protein. A still further object is to provide an extraction method which is specifically adapted for extracting acylase from whole kidney, and particularly whole hog kidney. It is another object of this invention to provide a method of purifying aqueous extracts of acylase in which the number of steps to achieve a product of high potency is reduced, while at the same time obtaining high yields of acylase. Further objects and advantages will appear as the specification proceeds.

The starting material for use in this invention is preferably comminuted whole hog kidney, i. e., kidney material containing both the cortex and the medulla. The acylase is concentrated in the cortex, while the medulla contains acylase-inactive proteins, and therefore it would be expected to increase the difficulty of preparing acylase by employing whole kidney. This is probably the reason that previous processes have employed demedullated kidneys. However, it is one of the signal features of the extraction method of this invention that aqueous extracts of comparable purity can be obtained from whole kidney as from demedullated kidney. This permits the cumbersome process step of removing the medulla from the kidney cortex to be eliminated. However, the extraction method of this invention can also be advantageously applied to demedullated kidney, if desired, and in general it is applicable to acylase-bearing kidney tissue.

The extraction is carried out by contacting acylase-bearing kidney tissue with an aqueous extracting medium containing from 10 to 20% by volume of ethanol. In other words, the liquid mixture of water and ethanol in which the tissue solids are suspended should contain from 80 to 90% water and from 10 to 20% ethanol by volume. Optimum results are achieved when the ethanol is present in the liquid mixture in the amount of from 13 to 17% by volume. It will be understood that the concentrations set out are final concentrations and that in adding ethanol and water to the kidney material allowance is to be made for the water already present in the kidney material. The ethanol has been found to function to selectively retard the extraction of acylase-inert protein material, such as that in the medulla, and while at the same time permitting a substantially complete extraction of the acylase to be achieved.

Instead of ethanol, similar concentrations of other monohydroxy alkanes containing less than 4 carbon atoms, such as methanol, propanol and isopropanol, can be used. Equivalent concentrations of other water-miscible organic precipitating agents for proteins, and in particular the aliphatic ketones having less than 4 carbon atoms, can also be used with some success for this purpose.

The pH of the extraction medium during the extracting step is important, and in general it should range from 5.1 to 7.0. Preferably, especially when ethanol is used as the organic solvent, the pH is within the range from 5.5 to 6.0.

The temperatures in the extraction step and in the subsequent purification steps should be sufficiently low to prevent the denaturing of the acylase. The temperatures which are usual in handling protein mixtures can be employed, e. g., from 10° C. to the freezing point of the solutions. A safe range is from 5° C. to −5° C.

After the acylase-bearing kidney tissue has been contacted with the extracting medium for a sufficient time to complete the extraction, the spent residue solids are separated from the aqueous extract. The aqueous extract thus obtained is then subjected to further purifying steps for the purpose of separating acylase-inert proteins from the acylase. It will be apparent from the following that these purification steps are broadly applicable to crude aqueous extracts of acylase.

In the preferred embodiment of this invention, the tissue residue is separated from the extract by centrifugation, and the centrifugate is treated to precipitate an acylase-inert protein fraction. When the aqueous extract contains from 10 to 20% of ethanol or other equivalent organic solvent, as preferred, it is only necessary to bring the pH within the range from 4.5 to 5.5, and allow the extract to stand until the acylase-inert precipitate is formed. When this purification step is employed in conjunction with the extraction step previously mentioned, it is preferred to carry out the extraction step at a pH substantially above 5.5, and then to adjust the pH to a point substantially below 5.5 to effect the purification. Optimum results are achieved when the extraction is carried out at a pH from 5.6 to 5.8, followed by precipitation at a pH of 5.0 to 5.2. However, good results are obtained in the purification step by employing pH's within the range from 4.9 to 5.3, especially in conjunction with ethanol concentrations of from 13 to 17% by volume.

The acylase-inert precipitate thus formed can be separated by any suitable means, such as centrifugation and filtration. As the next step, the acylase can be precipitated from the supernatant in various ways. For example, as in the prior art processes, the acylase can be precipitated at a pH of 5.1 with 30% alcohol. The acylase precipitate is separated from the supernatant which is discarded. The separated precipitate can be further treated by suspending it in water and adjusting the pH of the suspension to 6.8, and then subjecting the suspension to shell freezing and lyophilization. This pH adjustment increases the stability of the lyophilized preparation. In general, pH's of from 5.5 to 7.0 produce a relatively stable acylase product. Various other details of the process may be mentioned for purpose of completeness of disclosure. In the extraction step, it has been found advantageous to employ from 2 to 5 volmes of the liquid extracting medium to each volume of tissue solids. The extraction will usually require at least 2 hours to complete, but longer times are not objectionable. Usually the extraction will be allowed to proceed overnight.

This process can also be used for producing both acylase and renin from the same batch of kidney tissue. The precipitate obtained in the first purifying step described above has been found to contain substantial quantities of renin.

The extracting and purifying methods of this invention are set forth in specific illustrative embodiments in the following examples.

Example I

In general, the procedure for preparing acylase from kidney tissue involves the following principal steps:
1. The kidneys are extracted at pH 5.7 in 15% alcohol.
2. An inert precipitate is removed from the extract at pH 5.1 in 15% alcohol.
3. The acylase fraction is then precipitated at pH 5.1 in 30% alcohol.

These steps are illustrated in greater detail in the following examples.

Example II

Fresh hog kidneys were collected at the hog kill and finely ground in a meat grinder. The ground tissue was suspended in three and one-half volumes of 18.5% alcohol, at 23° F., to give a final alcohol concentration of 15%. The suspension was adjusted to pH 5.7 by the addition of 1 N HCl and the extraction was continued overnight using medium agitation.

The suspension was separated in a refrigerated Sharples centrifuge at 23° F. The extract obtained was adjusted to pH 5.1 by the addition of 1 N HCl and the resulting suspension was held overnight at 23° F.

The precipitate was removed by means of a refrigerated Sharples centrifuge at 23° F. and discarded. The alcohol concentration of the effluent was adjusted to 30% by the capillary addition of cold 95% alcohol. The addition was adjusted to maintain a temperature below 23° F. and the resulting suspension held overnight at 23° F.

The above was separated in a refrigerated Sharples centrifuge and the effluent discarded. The precipitate was suspended in distilled water at 32° F. and the suspension adjusted to pH 6.8 to stabilize the acylase during drying. The suspension was then shell-frozen and lyophilized.

Approximately 7 grams of the acylase fraction per kg. of hog kidney were obtained with a potency of approximately 3000 μM/hr./mg. N.

Example III

370#' of fresh comminuted hog kidney was suspended in 575 liters of 18.5% ethanol adjusted to a pH of 5.7 with 3 liters of normal hydrochloric acid solution. The extraction was carried out by agitating the suspension at −3° C. for 18 hours. The spent residue was separated in a Sharples centrifuge, giving an extract volume of 575 liters. The pH of the extract was adjusted to 5.1 with 1 liter of normal hydrochloric acid, and the extract was allowed to stand for 18 hours at −3° C. The precipitate was separated in a Sharples centrifuge. The acylase-inert precipitate had a dry weight of around 900 grams, while the supernatant had a volume of around 560 liters. The acylase was then precipitated from the supernatant by adding 130 liters of 95% ethanol to produce a concentration of 30% ethanol. The supernatant was allowed to stand for 18 hours at −8° C., after which the acylase precipitate was separated in a Sharples centrifuge. The acylase precipitate had a wet weight of 5 kilograms, and after being lyophilized had a dry weight of 1 kilogram.

While in the foregoing specification specific details and embodiments of this invention have been set forth for the purpose of illustration, it will be apparent to those skilled in the art that many of the specific details and embodiments set forth can be varied considerably without departing from the broad idea of the invention.

We claim:
1. In a method of preparing acylase, the steps of contacting acylase-bearing kidney tissue with a mixture of water and from 10 to 20% by volume of a monohydroxy alkane having less than 4 carbon atoms at a pH of from 5.1 to 7.0 and a temperature of less than 10° C. to obtain an extract of acylase, and separating the acylase extract from the tissue residue.

2. The method of claim 1 in which said acylase-bearing kidney tissue is whole kidney tissue.

3. The method of claim 1 in which said monohydroxy alkane is ethanol.

4. In a method of preparing acylase, the steps of contacting acylase-bearing kidney tissue with a mixture of water and from 13 to 17% by volume of ethanol at a pH of from 5.5 to 6.0 and a temperature of less than 10° C. to obtain an extract of acylase, and separating the acylase extract from the tissue residue.

5. The method of claim 4 in which said acylase-bearing kidney tissue is whole hog kidney tissue.

6. In a method of preparing acylase, the steps of adjusting a crude aqueous extract of acylase containing from 10 to 20% by volume of a monohydroxy alkane having less than 4 carbon atoms to a pH of from 4.5 to 5.5 at a temperature of less than 10° C. to precipitate an acylase-inert protein fraction, and separating said precipitate from the acylase solution.

7. The method of claim 6 in which said monohydroxy alkane is ethanol.

8. In a method of preparing acylase, the steps of adjusting a crude aqueous extract of acylase containing from 13 to 17% by volume of ethanol to a pH of from 4.9 to 5.3 at a temperature of less than 10° C. to precipitate an acylase-inert protein fraction, and separating said precipitate from the acylase solution.

9. In a method of preparing acylase, the steps of contacting acylase-bearing kidney tissue with a mixture of water and from 10 to 20% by volume of a monohydroxy alkane having less than 4 carbon atoms at a pH of from 5.1 to 7.0 and a temperature of less than 10° C. to obtain an extract of acylase, separating the acylase extract from the tissue residue, adjusting said acylase extract to a pH of from 4.5 to 5.5 at a temperature of less than 10° C. to precipitate an acylase-inert protein fraction, and separating said precipitate from the acylase solution.

10. In a method of preparing acylase, the steps of contacting comminuted whole hog kidney with a mixture of water and from 13 to 17% by volume of ethanol at a pH of from 5.5 to 6.0 and a temperature of less than 10° C. to obtain an extract of acylase, separating the acylase extract from the tissue residue, adjusting said acylase extract to a pH of from 4.9 to 5.3 at a temperature of less than 10° C. to precipitate an acylase-inert protein fraction, and separating said precipitate from the acylase solution.

References Cited in the file of this patent

UNITED STATES PATENTS 2,376,841    Wolf _____ May 22, 1945

OTHER REFERENCES

Fodor et al.: Journal of Biological Chemistry, vol. 178, No. 1, March 1949, pages 503 to 509 (particularly pages 503 to 505).

Price et al.: Journal of Biological Chemistry, vol. 179, No. 3, July 1949, pages 1169 to 1174 (particularly pages 1169 to 1171).